Aug. 4, 1925.

C. MOCCIA 1,548,475

TALKING MACHINE

Filed Sept. 13, 1923

INVENTOR
Constantino Moccia
BY
ATTORNEY

Patented Aug. 4, 1925.

1,548,475

UNITED STATES PATENT OFFICE.

COSTANTINO MOCCIA, OF LYNCH MINES, KENTUCKY.

TALKING MACHINE.

Application filed September 13, 1923. Serial No. 662,381.

*To all whom it may concern:*

Be it known that I, COSTANTINO MOCCIA, a citizen of Italy, residing at Lynch Mines, in the county of Harlan and State of Kentucky, have invented certain new and useful Improvements in Talking Machines, of which the following is a specification.

This invention relates to talking machines of the disk type, which are known as gramophones, and it has for an object the provision of a novel machine of this type having a double drive device permitting the machine to be electrically operated, when electric current is available, a further object relating to the provision of a novel speed regulating device.

For further comprehension of the invention, and of the objects and advantages thereof, reference will be had to the following description and accompanying drawings, and to the appended claims in which the various novel features of the invention are more particularly set forth.

Fig. 1 of the drawings is a vertical sectional view showing a gramophone constructed according to my invention, the sound reproducing mechanism being omitted, this view being taken on the line 1—1 of Fig. 2.

Fig. 2 is a horizontal sectional view taken on the line 2—2 of Fig. 1.

Referring now to the drawings my improved gramophone comprises a casing including a base 10 and top 11. Upon the base 10 is mounted an electric motor 12 having a pulley 13 fixed to its rotor shaft, this pulley having looped thereover a belt 14 which is looped also over a pulley 15 on a horizontal shaft 16. Upon this shaft 16 is fixed a worm pinion 18 which meshes with a worm gear 19 loose on the turntable shaft 20 on the upper end of which the usual turntable 21 is fixed. Carried by the shaft 16 is a speed regulator of the centrifugal type and consisting of a number of resilient straps 23 fixed at opposite ends to collars 24 and 25 respectively tight and loose on the said shaft, these straps having weights 26 fixed thereto between their ends. Fixed to the collar 25 is a friction disk 27 adapted to engage braking elements 28 carried by a disk 29 which is loose on shaft 16.

The disk 29 is adapted to be shifted by means of a lever arm 32 having a slot and pin connection 33 with the hub of the disk and fixed on a vertical shaft 34 on which is fixed a second lever arm 35 having a slot and pin connection 36 with one end of a rock lever 37 fulcrumed between its ends as at 38, the opposite end of this lever 37 being engaged by the free end of an arm 40 fixed to a vertical shaft 41 which extends upward through the top 11 and has a suitable operating handle 42 on the top end thereof. This handle 42 may be locked in adjusted positions by means of a tooth 43 on its underside which is pressed by the resiliency of the arm against a serrated segment 44 fixed to the top 11. Connected to the free end of the arm 40 is a link 46 which carries a pulley 47 adapted to bear on one side of the top reach of the belt 14, this pulley being located between a pair of pulleys 48 which bear on the opposite side of the belt. The parts are so proportioned that when the braking element 29 is adjusted to decrease the speed the pulley 47 is moved to lessen the tension of the belt 14 and so permit the latter to slip.

To drive the turntable 21, in the event that electric current is not available, I provide a spring motor 50 which is connected through a train of reducing gears indicated generally at 51 with a pinion 52 loose on the turntable shaft 20, a clutch being provided whereby the said pinion, and the worm gear 19, are operatively connected to the shaft when desired. This clutch is in the form of a sleeve 54 feathered to the shaft 20 and having clutch faces on opposite ends adapted to engage between the clutch elements 52′ and 19′ on the pinion and gear respectively. The clutch sleeve 54 is shifted back and forth on the shaft by means of a bell crank lever 55 which engages the sleeve in the usual manner at one end and has connected to its opposite end a rod or link 56 which passes outward through the side of the casing and has a screw threaded outer end passing through a nut 57 having a swivel connection with the casing wall.

In order to utilize the speed control device mounted on the shaft 16 when the spring motor is used, a bevel gear 62 is loosely mounted on the turn-table shaft 20 above the worm gear 19 and is adapted to be engaged by a clutch sleeve 63 feathered on the shaft 20 and adapted to engage a clutch element 62′ on the said bevel gear. This clutch sleeve 63 is adapted to be moved along the shaft by a bell crank lever 64 which is connected at one end thereto and at its opposite end to the link 56 before referred to. The bevel gear 62 meshes with a like gear 65 on one end of a horizontal shaft 66 which has a spur gear 67 on its other end meshing with a spur pinion 68 on the shaft 16. As will be apparent from the arrangement of parts shown, the bevel gear 62 and the pinion 52, will both be operatively connected to and disconnected from the shaft 20 in unison, and inversely with respect to the bevel gear 19, so that when the spring motor is used the speed regulator will function. To free the shaft 16 from operative relation to the motor 12 when the spring motor is running the pulley 15 is loose on shaft 16 and is operatively engaged therewith by means of a clutch sleeve 70 feathered on said shaft and adapted to engage a clutch element 15' on the pulley. This clutch sleeve 70 is adapted to be shifted by means of one end of a bell crank lever 72 whose opposite end has a slot and pin connection 73 with one end of a rock lever 74 fulcrumed as at 75, the other end of this rock lever projecting between lugs 75 on the link 56.

When the turntable 21 is being driven from the electric motor 12 the clutch members 54 and 63 are retained in position with the gears 52 and 62 out of operative relation to shaft 20, and the gear 19 in operative relation to said shaft. The clutch element 70 is in position with the pulley 15 operatively engaged with the shaft 16. The turntable is then driven from the motor 12 through pulley 13, belt 14, pulley 15, shaft 16, worm pinion 18 and worm gear 19. When it is desired to use the spring motor the rod 56 is adjusted, operating the levers 55, 64 and 72 thereby moving the clutch members 54 and 63, to effect operative engagement between the shaft 20 and the respective gears 52 and 62, at the same time freeing the gear 19 from operative engagement with shaft 20 and the pulley 15 from operative engagement with shaft 16. The shaft 20 is then driven from the motor 50 through the train of gears 51, while the speed regulator is driven from shaft 20 through the gear 65, shaft 66, and gears 67 and 68.

While I have illustrated and described a preferred embodiment of my invention it is to be understood that I do not limit myself to the precise construction herein shown and that various changes and modifications might be made therein without departing from the spirit and scope of the invention as defined in the appended claims.

Having thus described my invention what I claim as new and desire to protect by Letters Patent of the United States is as follows:

1. In a talking machine, a turntable, a shaft on which said turntable is mounted, a second shaft having a gear connection with said turntable shaft, an electric motor, a spring motor, drive connections between the electric motor and the said second shaft, and between the spring motor and the turntable shaft, a drive connection between said turntable shaft and said second shaft, a series of clutch elements mounted on said turntable shaft and adapted for simultaneous adjustment to engage the drive connection from the spring motor to the turntable shaft and disengage the said gear connection between the turntable shaft and the drive connection therefrom to the said second shaft, and another clutch mounted on said second shaft, and adapted to be operated simultaneously with the said series of clutches on the said turntable shaft to engage the drive connection from the electric motor to the said second shaft.

2. In a talking machine, a turntable, a shaft on which said turntable is mounted, a second shaft having a gear connection with said turntable shaft, an electric motor, a spring motor, drive connections between the electric motor and the said second shaft, and between the spring motor and the turntable shaft, a drive connection between said turntable shaft and said second shaft, a series of clutch elements mounted on said turntable shaft and adapted for simultaneous adjustment to engage the drive connection from the spring motor to the turntable shaft and disengage the said gear connection between the turntable shaft and the drive connection therefrom to the said second shaft, and another clutch mounted on said second shaft, and adapted to be operated simultaneously with the said series of clutches on the said turntable shaft to engage the drive connection from the electric motor to the said second shaft, and means for adjusting all of said clutches in unison comprising a series of levers engaged with the respective clutches, and a thrust rod engaged with all of said levers.

In testimony whereof I have affixed my signature.

COSTANTINO MOCCIA.